E. CHAMBERLIN.
Whip-Socket.
No. 2,387. Reissued Nov. 6, 1866.
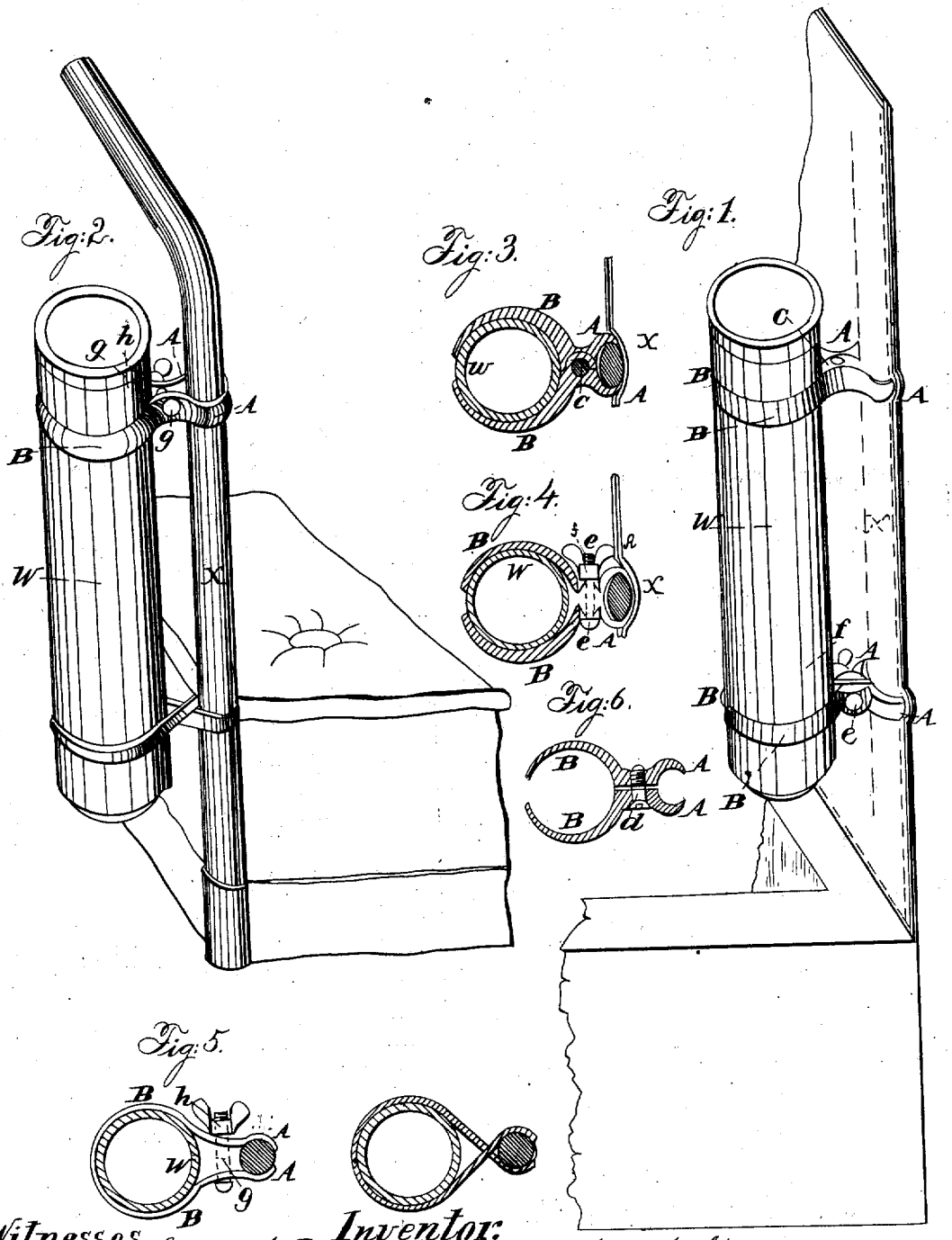
Witnesses: Charles D. Kellum, Duncan McFarland
Inventor: Edwin Chamberlin
N. PETERS, PHOTO-LITHOGRAPHER, WASHINGTON, D. C.

UNITED STATES PATENT OFFICE.

EDWIN CHAMBERLIN, OF TROY, NEW YORK.

WHIP-SOCKET FASTENINGS.

Specification forming part of Letters Patent No. 43,896, dated August 23, 1864; Reissue No. 2,387, dated November 6, 1866.

*To all whom it may concern:*

Be it known that I, EDWIN CHAMBERLIN, of the city of Troy, county of Rensselaer, and State of New York, have heretofore invented certain new and useful Improvements in Whip-Socket Fastenings, upon which Letters Patent of the United States of America were granted to me bearing date the 23d day of August, A. D. 1864; and I do hereby declare that the following is a full, clear, and exact description of the nature, construction, and the mode or manner of the use and operation of the same, reference being hereby had to the accompanying drawings, which make a part of this my new, corrected, and amended specification; and I do now surrender the said Letters Patent in order that the invention and improvements aforesaid may herein be more fully specified, described, and set forth, and by such amended and corrected specifications, claims, and drawings, my rights thereto therein shall be more fully and permanently protected as by law provided.

Like letters represent and refer to like or corresponding parts.

Figure 1 represents a whip-socket containing my invention, and secured to a rod or bar in one end of a carriage-dash, and hereinafter more fully described. Fig. 2 also represents a whip-socket fastened to a rod or bar at its upper end, and in the railing at or near the end of the driver's seat of a carriage, and which arrangement is but one modification of my said improvements, as will hereinafter more fully appear. Fig. 3 represents a whip-socket fastening which may be used at or near the upper end of the whip-socket, while Fig. 4 represents a device which may be used to fasten or secure the lower end of a whip-socket, and applied and secured to the dash of carriages in the manner substantially as herein described and set forth. Fig. 5 is a plan of the upper whip-socket fastening shown at Fig. 2, with sections of the parts of the rod and whip-socket to which such fastening is attached in Fig. 2. Fig. 6 is a longitudinal section of a modification of my said whip-socket fastening.

The nature of my invention consists in the employment and combination of a separate and detachable or removable whip-socket fastening or fastenings with a dash, covered or otherwise, of a land or road carriage, or to and with any part thereof, in the manner and by the means substantially as herein-described and set forth.

My main object in the making of the said invention and improvements is and has been to produce a cheap and durable whip-socket fastening for carriages which can be made and sold as a separate and distinct, as well as complete, article of manufacture, and which shall be so constructed and arranged that by means thereof an ordinary whip-socket can be conveniently and securely fastened in a neat manner to, and readily and easily separated from, the upright end bar of the frame, which is ordinarily inclosed in the leather dash, or any equivalent therefor, of land-carriages or other vehicles without injury to the dash.

The said fastening may also be used for the purpose of securing in a proper manner a whip-socket to a bar or rod of suitable size and shape in the end railing of a driver's seat or other part of a sleigh, carriage, or other vehicle.

The aforesaid detachable and removable whip-socket fastening or fastenings may be made of malleable cast-iron, or of any other material which will answer the purpose required.

A A are jaws for receiving, embracing, and clamping or griping the rod or bar *x*, or any equivalent therefor, in any suitable manner, and which shall be in the end of a dash or other part of a vehicle, which rod or bar may or may not be covered with leather. It is usual, however, to cover the same with leather, or, when the dash is made of leather, with a frame-work of iron. Then such leather will, of course, cover such rod or bar.

B B are jaws for the purpose of receiving, holding, and griping the whip-socket *w*, for the purpose of holding the driver's whip in a suitable place ready for use.

The said jaws A A and said jaws B B are made and cast upon and with the jaw-piece A′ A′. These jaw-pieces are held in place by means of a suitable screw passing into and through the same in any convenient manner deemed best, and which screw may be seen represented at *a*, *c*, *f*, and *g* of the accompanying drawings, and it may be in any form or construction desirable, and is for the purpose of holding the aforesaid jaws A and B in their proper places.

The said jaw-bar A′ and the said jaws A and B may be constructed in any suitable form or shape to answer the required purpose. Then the said whip-socket fastenings are placed at a suitable distance apart upon the aforesaid rod or bar *x*, and the said whip-socket fastening *w* is then inserted in the said clamps or jaws or holders B B, or any equivalent therefor, in the manner substantially as shown in the accompanying drawings. The whip-socket *w* will therefore be firmly secured to the said rod or bar in the manner substantially as aforesaid and substantially as shown in the said drawings, and in such manner that the said whip-socket can or may be removed from such or equivalent fastenings, and, at the same time, permit such fastenings to be detached from such bar or rod at such times as it may be desirable.

In the employment and combination of the said griping, holding, and receiving jaws A A, and the whip-socket, clamp, holder, or griping-jaws B B, I adopt any convenient and suitable form, shape, and construction for the purpose aforesaid, several modifications of which are shown at Figs. 1, 2, 3, 4, 5, and 6 of the accompanying drawings.

The said jaws, clamps, or holders A and B may be made in suitable parts, and of iron, steel, malleable iron, semi-steel, or other suitable material, and secured together in their required place and position for the purpose required by a pivot, *c*, Fig. 3, or by a screw, *a*, Fig. 6, or by a screw-bolt, *e*, and thumb-nut *f*, Fig. 4, or by any other suitable mechanical means which will answer the required purpose.

One jaw or clamp, B, may extend entirely around the whip-socket until it reaches and comes into contact with the said jaw-bar A′, and then be securely fastened in any manner deemed best with one of the said jaws A made therewith, while the other jaw A is made detachable and removable, so as to fasten such whip-socket to said dash when the loose or detachable jaw aforesaid shall be put into its proper place and there firmly held by means of a screw, substantially as aforesaid. In such case the said whip-socket will be surrounded and held on all its surface, substantially as seen at Fig. 5, with the exception that one of the said jaws A will be firmly secured thereto while the other is detachable, as aforesaid. This would therefore form a ring around the said whip-socket, while the said dash-jaws A A are arranged and combined with one side or part thereof, substantially as aforesaid, and for the purpose aforesaid, and which would be only one modification of the device shown at Fig. 5, and of the device shown at Figs. 3, 4, and 6.

The form of the construction is wholly immaterial, so long as the main part and feature of my said improvements and invention are carried out and into successful use.

There are many forms of the construction which may be had; but I have herein endeavored to represent and describe those which I deem the best, most convenient, and durable.

By this invention, and by these improvements, I am enabled to produce whip-socket fastenings for land or other carriages which shall properly receive and hold the driver's whip, and at the same time be attached to their proper places without injury to the dash, covered with leather or otherwise, or to the whip-socket fastening, while at the same time the whip-socket and whip-socket fastening and fastenings may be detached or removed therefrom for any purpose whatever.

Having thus described the nature, construction, and operation of my said invention and improvements, what I claim, and desire to secure by Letters Patent of the United States of America, is—

1. A detachable and removable whip-socket fastening attached to the dash or other suitable parts of a land-carriage or other vehicle in the manner and for the purposes substantially as herein described and set forth.

2. A whip-socket fastening having a clamp or holder, B B, for a whip-socket, combined with the jaws A A, for receiving and griping a bar or rod in a covered dash or other part of a carriage or other vehicle, substantially as herein described and set forth.

In testimony whereof I have hereunto set my hand this 10th day of September, A.D. 1866.

EDWIN CHAMBERLIN.

Witnesses:

CHARLES D. KELLUM,
LU. CHAMBERLIN.